(12) United States Patent
Li et al.

(10) Patent No.: US 10,812,968 B2
(45) Date of Patent: Oct. 20, 2020

(54) FLEXIBLE SIGNALING OF CAPABILITY OF UE PROCESSING TIME IN WIRELESS COMMUNICATIONS

(71) Applicant: MediaTek Inc., Hsinchu (TW)

(72) Inventors: Xiu-Sheng Li, Hsinchu (TW); Wenze Qu, Beijing (CN); Pei-Kai Liao, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 16/181,290

(22) Filed: Nov. 5, 2018

(65) Prior Publication Data

US 2019/0141520 A1 May 9, 2019

Related U.S. Application Data

(60) Provisional application No. 62/583,566, filed on Nov. 9, 2017.

(51) Int. Cl.

| *H04W 8/24* | (2009.01) |
| *H04W 72/04* | (2009.01) |
| *H04W 88/06* | (2009.01) |
| *H04W 28/06* | (2009.01) |
| *H04L 5/00* | (2006.01) |

(Continued)

(52) U.S. Cl.
CPC ............ *H04W 8/24* (2013.01); *H04B 7/0628* (2013.01); *H04L 5/0055* (2013.01); *H04W 28/06* (2013.01); *H04W 72/0453* (2013.01); *H04W 88/06* (2013.01); *H04B 7/0413* (2013.01)

(58) Field of Classification Search
CPC ... H04W 8/24; H04W 72/0453; H04W 88/06; H04W 28/06; H04L 5/0055; H04B 7/0628; H04B 7/0413
See application file for complete search history.

(56) References Cited

U.S. PATENT DOCUMENTS

| 7,599,698 B2 | 10/2009 | Cheng et al. |
| 10,292,095 B1 * | 5/2019 | Park .................... H04W 48/20 |

(Continued)

FOREIGN PATENT DOCUMENTS

CN    104015122 A    10/2014

OTHER PUBLICATIONS

State Intellectual Property Office of China, International Search Report and Written Opinion for International Patent Application No. PCT/CN2018/114802, dated Feb. 15, 2019.

(Continued)

*Primary Examiner* — Ajay Cattungal
(74) *Attorney, Agent, or Firm* — Han IP PLLC; Andy M. Han

(57) ABSTRACT

Techniques and examples of flexible signaling of capability of use equipment (UE) processing time in wireless communications are described. Accordingly, a UE establishes wireless communication with a network node of a wireless network. The UE also determines whether the UE is capable of operating in a second mode in addition to a first mode. The UE then transmits to the network node a report indicating capability of the UE to operate in the second mode and a condition with respect to a throughput associated with operating in the second mode. The UE performs a task in less time in the second mode than in the first mode.

18 Claims, 4 Drawing Sheets

(51) Int. Cl.
*H04B 7/06* (2006.01)
*H04B 7/0413* (2017.01)

(56) References Cited

U.S. PATENT DOCUMENTS

| | | | | |
|---|---|---|---|---|
| 2012/0214494 A1* | 8/2012 | Awoniyi | ............... | H04W 88/10 |
| | | | | 455/439 |
| 2012/0218922 A1* | 8/2012 | Klingenbrunn | ......... | H04J 4/005 |
| | | | | 370/280 |
| 2012/0287876 A1* | 11/2012 | Kazmi | .................. | H04B 7/022 |
| | | | | 370/329 |
| 2013/0344902 A1 | 12/2013 | Cili et al. | | |
| 2014/0126911 A1* | 5/2014 | Jovicic | .................. | H04B 10/11 |
| | | | | 398/96 |
| 2014/0219170 A1* | 8/2014 | Zhao | ....................... | H04W 8/24 |
| | | | | 370/328 |
| 2016/0057756 A1* | 2/2016 | Nammi | ............. | H04W 72/0466 |
| | | | | 370/335 |
| 2017/0289840 A1* | 10/2017 | Sung | ................. | H04W 28/0289 |
| 2018/0092087 A1* | 3/2018 | Zirwas | ................. | H04B 7/0619 |
| 2018/0115940 A1* | 4/2018 | Abedini | ............. | H04W 74/006 |
| 2019/0174516 A1* | 6/2019 | Shimezawa | ....... | H04W 72/1263 |

OTHER PUBLICATIONS

Taiwan Intellectual Property Office, Office Action for Taiwan Patent Application No. 107139546, dated Oct. 28, 2019.
Qualcomm Incorporated, UE Processing Time and HARQ management, 3GPP TSG-RAN WG1 Meeting #90bis, R1-1718569, Prage, Czech Republic, Oct. 9-13, 2017.
3GPP, Technical Specification Group Radio Access Network; NR; Physical channels and modulation (Release 15), 3GPP TS 38.211 v0.1.3 (Aug. 2017).

* cited by examiner

FLEXIBLE SIGNALING OF CAPABILITY OF UE PROCESSING TIME IN WIRELESS COMMUNICATIONS

CROSS REFERENCE TO RELATED PATENT APPLICATION

The present disclosure claims the priority benefit of U.S. Provisional Patent Application No. 62/583,566, filed on 9 Nov. 2017, the content of which is herein incorporated by reference in its entirety.

TECHNICAL FIELD

The present disclosure is generally related to wireless communications and, more particularly, to flexible signaling of capability of use equipment (UE) processing time in wireless communications.

BACKGROUND

Unless otherwise indicated herein, approaches described in this section are not prior art to the claims listed below and are not admitted as prior art by inclusion in this section.

In $5^{th}$-Generation (5G) New Radio (NR) communication systems, there are two capabilities of a UE defined in the $3^{rd}$-Generation Partnership Project (3GPP) specification with respect to UE processing time, expressed in terms of N1 or N2 symbols. In particular, the parameter N1 pertains to UE processing time for feedback of hybrid automatic repeat request (HARQ) acknowledgement (HARQ-ACK) for downlink (DL) transmissions. Additionally, the parameter N2 pertains to UE processing time for physical uplink shared channel (PUSCH) scheduling for uplink (UL) transmissions. According to the 3GPP specification for NR, the UE needs not report to a network whether the UE supports its first capability (capability 1) with respect to the parameters N1 and N2 in a baseline mode, since the first capability is mandatory for NR-capable UEs (or, put differently, all NR-capable UEs need to support capability 1). Moreover, the UE can report to the network its second capability (capability 2) with respect to the parameters N1 and N2 in an aggressive mode in which the UE performs a given task in less time than in the baseline mode. Additionally, the UE can report separately whether or not the second capability is supported for different subcarrier spacings (SCS) and for DL/UL transmissions.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

Under various proposed schemes in accordance with the present disclosure, flexible signaling in indication of UE capability may be enabled and implemented in a number of ways. That is, flexibility in signaling for the second capability may be accomplished in an aggressive mode under certain conditions. For instance, when signaling support for the second capability, a UE may also indicate parameters related to throughout (e.g., in terms of number of physical resource blocks (PRBs)) and carrier aggregation pertaining to the second capability of the UE.

In one aspect, a method may involve a processor of a UE establishing wireless communication with a network node of a wireless network. The method may also involve the UE determining whether the UE is capable of operating in a second mode in addition to a first mode. The method may further involve the UE transmitting to the network node a report indicating capability of the UE to operate in the second mode and a condition with respect to a throughput associated with operating in the second mode. The UE may perform a task in less time in the second mode than in the first mode.

In one aspect, a method may involve a processor of a UE establishing wireless communication with a network node of a wireless network. The method may also involve the UE determining whether the UE is capable of operating in a second mode in addition to a first mode. The method may further involve the UE transmitting to the network node a report indicating capability of the UE to operate in the second mode and a condition with respect to carrier aggregation (CA) associated with operating in the second mode. The UE may perform a task in less time in the second mode than in the first mode.

In one aspect, an apparatus (e.g., a UE) may include a transceiver and a processor. The transceiver may be capable of wireless communicating with a network node of a wireless network. The processor may be capable of determining whether the apparatus is capable of operating in a second mode in addition to a first mode. The processor may also be capable of transmitting, via the transceiver, to the network node a report indicating capability of the apparatus to operate in the second mode and either or both of: (a) a condition with respect to a throughput associated with operating in the second mode, and (b) a condition with respect to carrier aggregation (CA) associated with operating in the second mode. The apparatus may perform a task in less time in the second mode than in the first mode.

It is noteworthy that, although description provided herein may be in the context of certain radio access technologies, networks and network topologies such as 5G NR, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, and Internet-of-Things (IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to flexible signaling of capability of UE processing time in wireless communications. According to the present disclosure, a number of possible solutions may be implemented separately or jointly. That is, although these possible solutions may be described below separately, two or more of these possible solutions may be implemented in one combination or another.

Figure 1:
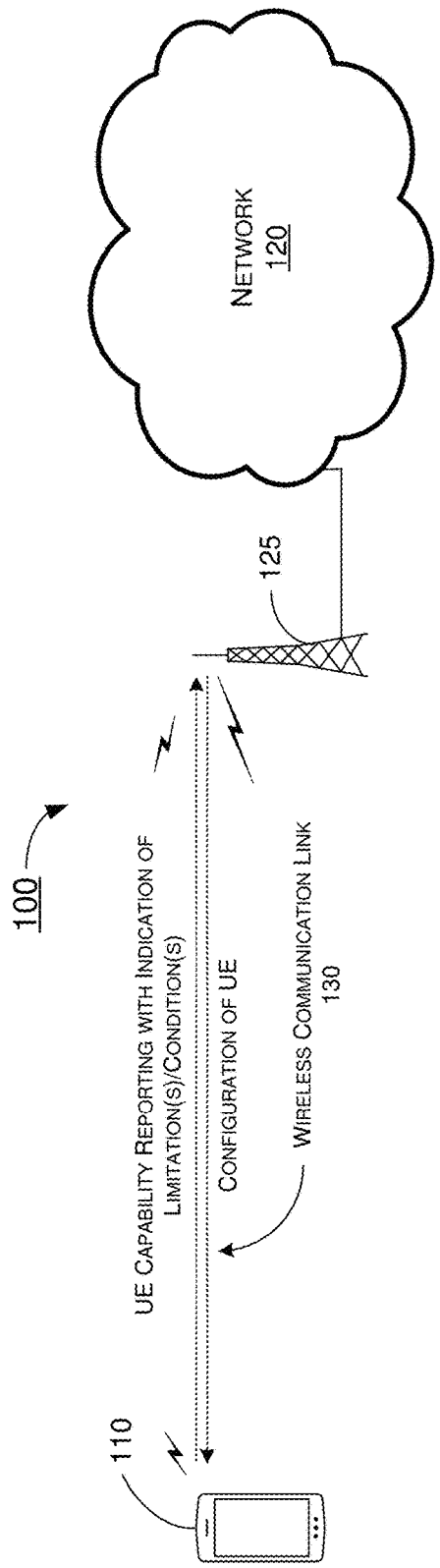
FIG. 1 is a diagram of an example scenario in which various examples in accordance with the present disclosure may be implemented.

FIG. 1 illustrates an example scenario 100 in which various examples in accordance with the present disclosure may be implemented. Scenario 100 may involve a UE 110 and a wireless communication network 120 (e.g., 5G/NR mobile network) having a network node 125 (e.g., gNB). UE 110 may establish a wireless communication link 130 with network 120 through network node 125 for uplink and downlink transmissions. In the context of 5G/NR, UE 110 may report to network 120 its capability in terms of processing time, represented by parameters N1 and N2. In particular, UE 110 may indicate to network 120 its processing time in terms of N1 symbols for decoding and preparing HARQ-ACK for transmission via PUSCH after receiving data from network node 125 via physical downlink shared channel (PDSCH). Additionally, UE 110 may indicate to network 120 its processing time in terms of N2 symbols for decoding and preparing UL transmission via PUSCH after receiving control signaling from network node 125 via physical downlink control channel (PDCCH).

Referring to FIG. 1, for baseline mode (capability 1), there may be multiple values for each of N1 and N2 depending on the scenario and SCS. For instance, regarding HARQ-ACK feedback, when there is no additional demodulation reference signal (DMRS) in PDSCH, the value of N1 may be 8, 10, 17 or 20, corresponding to SCS of 15 kHz, 30 kHz, 60 kHz or 120 kHz, respectively. When there is additional DMRS in PDSCH, the value of N1 may be 13, 13, 20 or 24, corresponding to SCS of 15 kHz, 30 kHz, 60 kHz or 120 kHz, respectively. Furthermore, regarding PUSCH scheduling, the value of N2 may be 10, 12, 23 or 36, corresponding to SCS of 15 kHz, 30 kHz, 60 kHz or 120 kHz, respectively.

Similarly, for aggressive mode (capability 2), there may be multiple values for each of N1 and N2 depending on the scenario and SCS. For instance, regarding HARQ-ACK feedback, when there is no additional demodulation reference signal (DMRS) in PDSCH, the value of N1 may be 3, 4.5 or 9, corresponding to SCS of 15 kHz, 30 kHz or 60 kHz, respectively. Additionally, regarding PUSCH scheduling, the value of N2 may be 5, 5.5 or 11, corresponding to SCS of 15 kHz, 30 kHz or 60 kHz, respectively.

Under various proposed schemes in accordance with the present disclosure, not only UE 110 may indicate to network 120 whether or not UE 110 is capable of operating in the aggressive mode, UE 110 may also indicate to network 120 addition information (e.g., limitation of UE 110 with respect to one or more parameters) when UE 110 indicates that it is capable of operating in the aggressive mode. For instance, when indicating to network 120 of its capability of operating in the aggressive mode, UE 110 may also indicate a certain limitation of UE 110 with respect to throughput (e.g., in terms of number of PRBs) and/or carrier aggregation (CA), as described in further detail below.

Under a first proposed scheme in accordance with the present disclosure, UE 110 may indicate to network 120 that UE 110 is capable of operating in the aggressive mode with a maximum throughput as a certain percentage of a peak throughput of UE 110. For example, UE 110 may indicate its maximum throughput in the aggressive mode as being X1% of the peak throughput of UE 110, with X1 being 0, 10, 20, . . . 100. As another example, UE 110 may indicate its maximum throughput in the aggressive mode as being X2% of a maximum number of PRBs, with X2 being 0, 20, 40, . . . 100. The term "maximum number of PRBs" herein may refer to the maximum number of PRBs as defined in the 3GPP specification for NR, the maximum number of PRBs of the operating channel bandwidth, or another definition. As a further example, UE 110 may indicate its maximum throughput in the aggressive mode as being X3% of a maximum number of PRBs per multiple-input-multiple-output (MIMO) layer by a maximum number of MIMO layers for DL or UL transmissions, with X3 being 0, 50 or 100.

Accordingly, under the first proposed scheme, the maximum throughput of UE 110 in the aggressive mode in terms of a specific number of PRBs may be communicated to network 120 through network node 125. For instance, in an event that the peak throughput is 273 PRBs, UE 110 may indicate "4.5", corresponding to 50% of 273 PRBs (or 136 PRBs), as its maximum throughput for SCS of 30 kHz. Moreover, UE 110 may report its support of aggressive mode (capability 2) per SCS and DL/UL separately.

Under a second proposed scheme in accordance with the present disclosure, UE 110 may indicate to network 120 that UE 110 is capable of operating in the aggressive mode with support of up to a certain number of configured carriers for CA. For example, UE 110 may indicate its maximum number of configured carriers supported for CA as being Y1, with Y1 being 1, 2, 3, . . . 16. The parameter Y1 may be configured for UE 110 regardless of baseline mode or aggressive mode. Alternatively, the parameter Y1 may be configured for UE 110 for the aggressive mode.

Accordingly, under the second proposed scheme, the maximum number of configured carriers supported by UE 110 for CA in the aggressive mode may be communicated to network 120 through network node 125. For instance, in an event that a number of configured carriers in a given band is less than or equal to the maximum number of configured carriers supported, then UE 110 may support the aggressive mode processing time on all the configured carriers supported. Otherwise, UE 110 may operate in a fallback mode.

In some cases, when operating in the fallback mode, UE 110 may support a single carrier. That is, UE 110 may support the aggressive mode on a lowest cell index among the configured carriers in the band. In some other cases, for fallback, UE 110 may support the baseline mode in the band, not the aggressive mode.

Under a third proposed scheme in accordance with the present disclosure, in an event that UE 110 supports operations in the aggressive mode, upon receiving capability report from UE 110, network 120 may configure UE 110 semi-statically by radio resource control (RRC) signaling or medium access control (MAC) control element (CE), or dynamically by downlink control indicator (DCI), for UE 110 to operate in the aggressive mode or the baseline mode. For example, for aggressive operation, network 120 may configure one K1 value with K1=0, semi-statically by RRC or MAC CE. For baseline operation, network 120 may configure more than one K1 value with K1>0. Accordingly, switching between aggressive operation and baseline operation may be realized by RRC configuration and/or reconfiguration, or by MAC CE. As another example, network 120 may dynamically configure more than one K1 value by DCI, with one candidate value of K1 being 0. The DCI may dynamically indicate K1=0 or another K1 value which is greater than 0. It is noteworthy that, above examples using K1 may also be applicable to K2.

Illustrative Implementations

Figure 2:
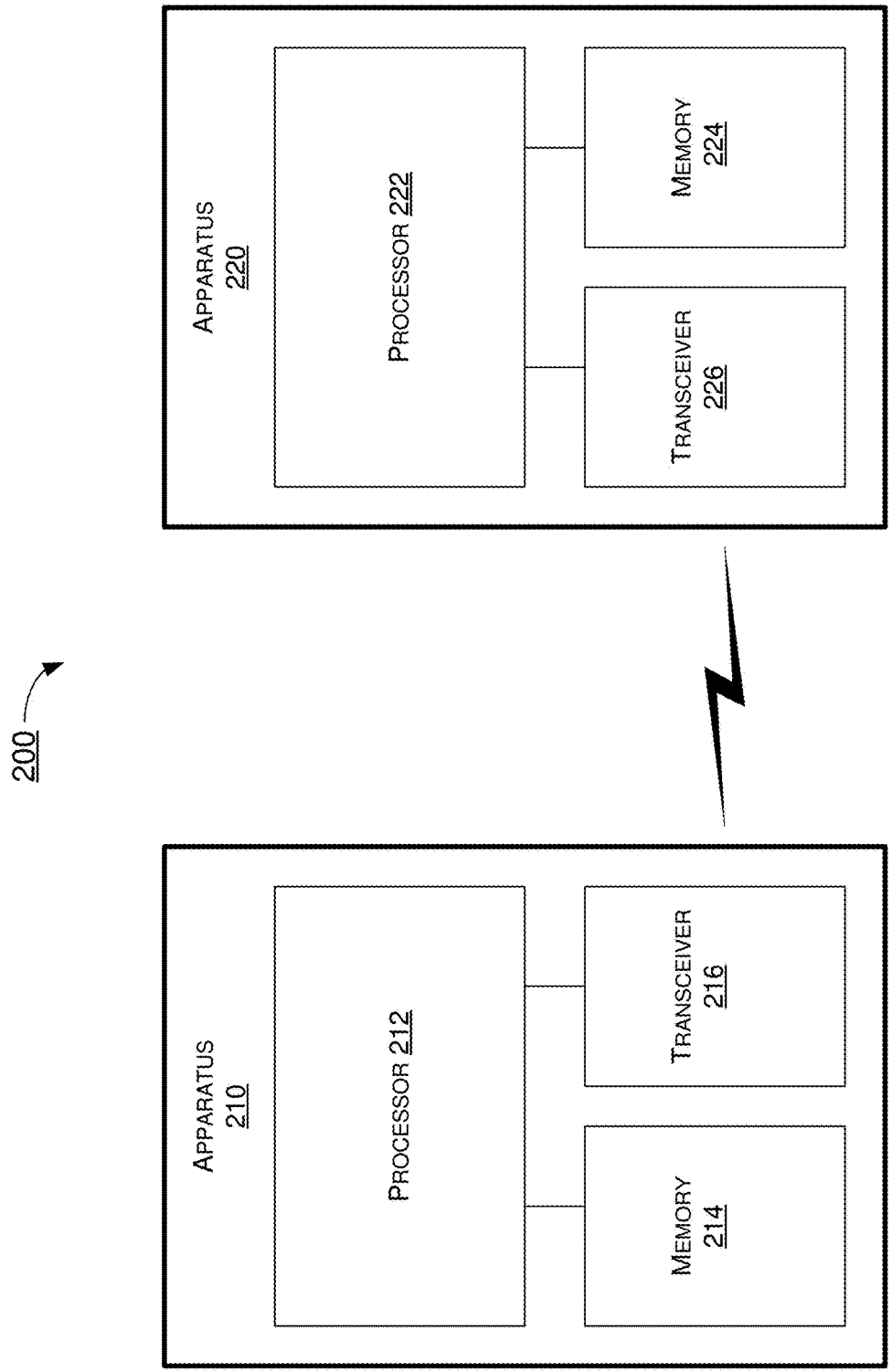
FIG. 2 is a block diagram of an example system in accordance with an implementation of the present disclosure.

FIG. 2 illustrates an example system 200 having at least an example apparatus 210 and an example apparatus 220 in accordance with an implementation of the present disclosure. Each of apparatus 210 and apparatus 220 may perform various functions to implement schemes, techniques, processes and methods described herein pertaining to flexible signaling of capability of UE processing time in wireless communications, including the various schemes described above with respect to various proposed designs, concepts, schemes, systems and methods described above as well as processes 300 and 400 described below.

Each of apparatus 210 and apparatus 220 may be a part of an electronic apparatus, which may be a network apparatus or a UE, such as a portable or mobile apparatus, a wearable apparatus, a wireless communication apparatus or a computing apparatus. For instance, each of apparatus 210 and apparatus 220 may be implemented in a smartphone, a smart watch, a personal digital assistant, a digital camera, or a computing equipment such as a tablet computer, a laptop computer or a notebook computer. Each of apparatus 210 and apparatus 220 may also be a part of a machine type apparatus, which may be an IoT apparatus such as an immobile or a stationary apparatus, a home apparatus, a wire communication apparatus or a computing apparatus. For instance, each of apparatus 210 and apparatus 220 may be implemented in a smart thermostat, a smart fridge, a smart door lock, a wireless speaker or a home control center. When implemented in or as a network apparatus, apparatus 210 and/or apparatus 220 may be implemented in an eNodeB in an LTE, LTE-Advanced or LTE-Advanced Pro network or in a gNB or TRP in a 5G network, an NR network or an IoT network.

In some implementations, each of apparatus 210 and apparatus 220 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 210 and apparatus 220 may be implemented in or as a network apparatus or a UE. Each of apparatus 210 and apparatus 220 may include at least some of those components shown in FIG. 2 such as a processor 212 and a processor 222, respectively, for example. Each of apparatus 210 and apparatus 220 may further include one or more other components not pertinent to the proposed scheme of the present disclosure (e.g., internal power supply, display device and/or user interface device), and, thus, such component(s) of apparatus 210 and apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including those pertaining to flexible signaling of capability of UE processing time in wireless communications in accordance with various implementations of the present disclosure.

In some implementations, apparatus 210 may also include a transceiver 216 coupled to processor 212. Transceiver 216 may be capable of wirelessly transmitting and receiving data. In some implementations, apparatus 220 may also include a transceiver 226 coupled to processor 222. Transceiver 226 may include a transceiver capable of wirelessly transmitting and receiving data.

In some implementations, apparatus 210 may further include a memory 214 coupled to processor 212 and capable of being accessed by processor 212 and storing data therein. In some implementations, apparatus 220 may further include a memory 224 coupled to processor 222 and capable of being accessed by processor 222 and storing data therein. Each of memory 214 and memory 224 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 214 and memory 224 may include a type of read-only memory (ROM) such as mask ROM, programmable ROM (PROM), erasable programmable ROM (EPROM) and/or electrically erasable programmable ROM (EEPROM). Alternatively, or additionally, each of memory 214 and memory 224 may include a type of non-volatile random-access memory (NVRAM) such as flash memory, solid-state memory, ferroelectric RAM (FeRAM), magnetoresistive RAM (MRAM) and/or phase-change memory.

Each of apparatus 210 and apparatus 220 may be a communication entity capable of communicating with each other using various proposed schemes in accordance with the present disclosure. For illustrative purposes and without limitation, a description of capabilities of apparatus 210, as a UE, and apparatus 220, as a base station of a serving cell of a wireless network (e.g., 5G/NR mobile network), is provided below. It is noteworthy that, although the example implementations described below are provided in the context of a UE, the same may be implemented and performed by a base station. Thus, although the following description of example implementations pertains to apparatus 210 as a UE, the same is also applicable to apparatus 220 as a base station (e.g., gNB or TRP).

In one aspect, processor 212 of apparatus 210 may establish wireless communication with apparatus 220 as a network node of a wireless network. Processor 212 may also determine whether apparatus 210 is capable of operating in a second mode in addition to a first mode, where apparatus 210 may perform a given task in less time in the second mode than in the first mode. Processor 212 may then transmit, via transceiver 216, to apparatus 220 a report indicating capability of apparatus 210 to operate in the second mode and a condition with respect to a throughput associated with operating in the second mode.

In some implementations, the report may indicate the throughput as a percentage of a maximum number of physical resource blocks (PRBs). In some implementations, the maximum number of PRBs may pertain to a maximum number of PRBs defined in 3GPP specification for NR. Alternatively, the maximum number of PRBs may pertain to a maximum number of PRBs of an operating channel bandwidth.

In some implementations, the report may indicate the throughput as a percentage of a peak throughput of the UE.

In some implementations, the report may indicate the throughput as a percentage of a maximum number of PRBs per MIMO layer by a maximum number of MIMO layers for DL or UL transmissions.

In some implementations, the report may further indicate a condition with respect to carrier aggregation (CA) associated with operating in the second mode.

In some implementations, the first mode may be a baseline mode, and the second mode may be an aggressive mode in which apparatus 210 completes a task in less time than in the baseline mode.

In one aspect, processor 212 of apparatus 210 may establish wireless communication with apparatus 220 as a network node of a wireless network. Processor 212 may also determine whether apparatus 210 is capable of operating in a second mode in addition to a first mode, where apparatus 210 may perform a given task in less time in the second mode than in the first mode. Processor 212 may then transmit, via transceiver 216, to apparatus 220 a report indicating capability of apparatus 210 to operate in the second mode and a condition with respect to carrier aggregation (CA) associated with operating in the second mode.

In some implementations, the report may indicate the condition with respect to CA by indicating a maximum number of configured carriers supported for CA when operating in the second mode.

In some implementations, the report may further indicate a condition with respect to a throughput associated with operating in the second mode.

In some implementations, the first mode may be a baseline mode, and the second mode may be an aggressive mode in which the UE completes a task in less time than in the baseline mode.

In some implementations, processor 212 may receive, via transceiver 216, control signaling from apparatus 220 that configures a maximum number of configured carriers supported for CA when apparatus 210 operates in the second mode or in both the first mode and the second mode.

In some implementations, processor 212 may further determine whether a number of configured carriers in a band is less than or equal to a maximum number of configured carriers supported for CA when operating in the second mode. Moreover, processor 212 may perform either of: (1) operating using all of the configured carriers in the band responsive to the number of the configured carriers in the band being less than or equal to the maximum number of configured carriers supported for CA, or (2) operating in the second mode with a single carrier in the band or in the first mode in the band responsive to the number of the configured carriers in the band being greater than the maximum number of configured carriers supported for CA.

Illustrative Processes

Figure 3:
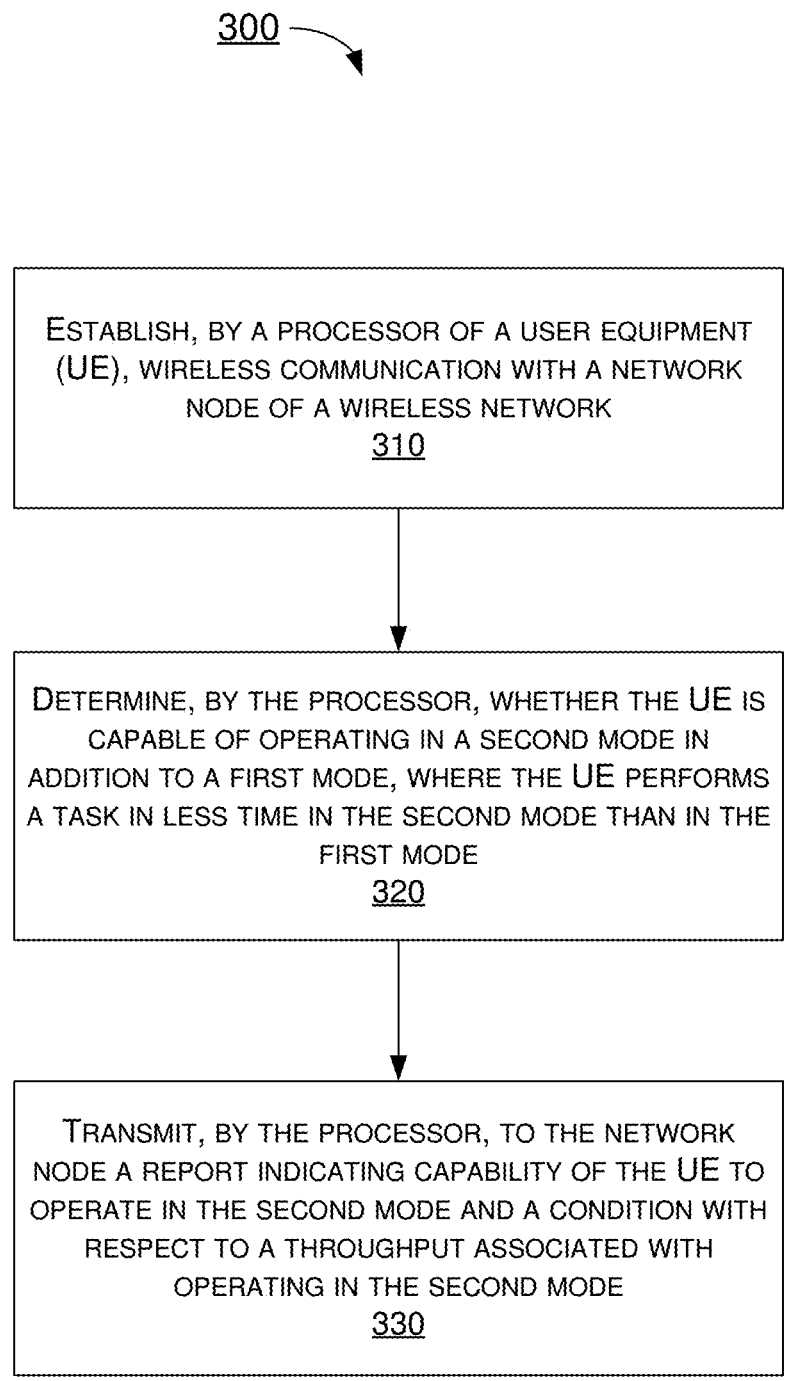
FIG. 3 is a flowchart of an example process in accordance with an implementation of the present disclosure.

FIG. 3 illustrates an example process 300 in accordance with an implementation of the present disclosure. Process 300 may represent an aspect of implementing various proposed designs, concepts, schemes, systems and methods described above. More specifically, process 300 may represent an aspect of the proposed concepts and schemes pertaining to flexible signaling of capability of UE processing time in wireless communications. Process 300 may include one or more operations, actions, or functions as illustrated by one or more of blocks 310, 320 and 330. Although illustrated as discrete blocks, various blocks of process 300 may be divided into additional blocks, combined into fewer blocks, or eliminated, depending on the desired implementation. Moreover, the blocks/sub-blocks of process 300 may be executed in the order shown in FIG. 3 or, alternatively in a different order. The blocks/sub-blocks of process 300 may be executed iteratively. Process 300 may be implemented by or in apparatus 210 and apparatus 220 as well as any variations thereof. Solely for illustrative purposes and without limiting the scope, process 300 is described below in the context of apparatus 210 as a UE and apparatus 220 as a base station. Process 300 may begin at block 310.

At 310, process 300 may involve processor 212 of apparatus 210 establishing wireless communication with apparatus 220 as a network node of a wireless network. Process 300 may proceed from 310 to 320.

At 320, process 300 may involve processor 212 determining whether apparatus 210 is capable of operating in a second mode in addition to a first mode, where apparatus 210 may perform a given task in less time in the second mode than in the first mode. Process 300 may proceed from 320 to 330.

At 330, process 300 may involve processor 212 transmitting, via transceiver 216, to apparatus 220 a report indicating capability of apparatus 210 to operate in the second mode and a condition with respect to a throughput associated with operating in the second mode.

In some implementations, the report may indicate the throughput as a percentage of a maximum number of physical resource blocks (PRBs). In some implementations, the maximum number of PRBs may pertain to a maximum number of PRBs defined in 3GPP specification for NR. Alternatively, the maximum number of PRBs may pertain to a maximum number of PRBs of an operating channel bandwidth.

In some implementations, the report may indicate the throughput as a percentage of a peak throughput of apparatus 210.

In some implementations, the report may indicate the throughput as a percentage of a maximum number of PRBs per MIMO layer by a maximum number of MIMO layers for DL or UL transmissions.

In some implementations, the report may further indicate a condition with respect to carrier aggregation (CA) associated with operating in the second mode.

In some implementations, the first mode may be a baseline mode, and the second mode may be an aggressive mode in which apparatus 210 completes a task in less time than in the baseline mode.

Figure 4:
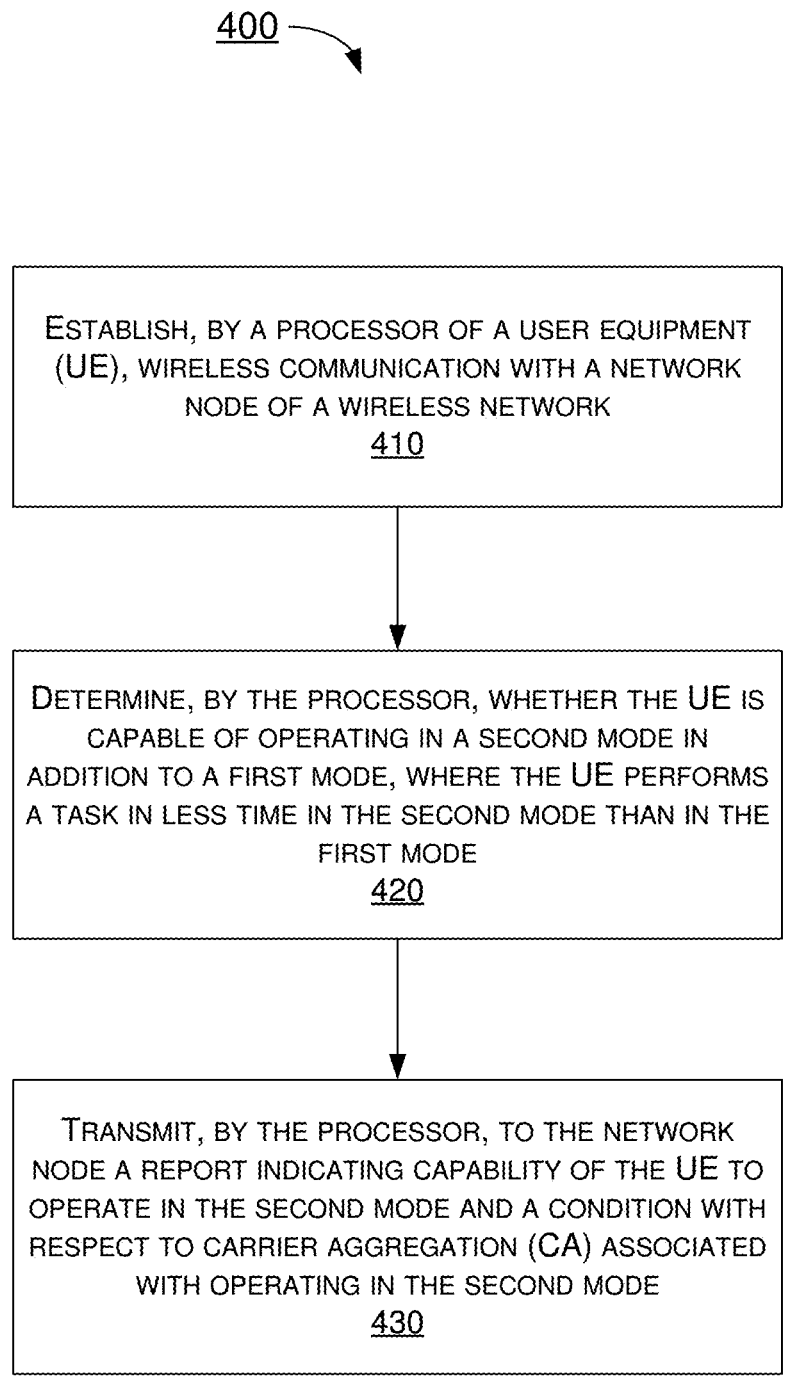
FIG. 4 is a flowchart of an example process in accordance with an implementation of the present disclosure.

FIG. 4 illustrates an example process 400 in accordance with an implementation of the present disclosure. Process 400 may represent an aspect of implementing various proposed designs, concepts, schemes, systems and methods described above. More specifically, process 400 may represent an aspect of the proposed concepts and schemes pertaining to flexible signaling of capability of UE processing time in wireless communications. Process 400 may include one or more operations, actions, or functions as illustrated by one or more of blocks 410, 420 and 430. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. The blocks/sub-blocks of process 400 may be executed iteratively. Process 400 may be implemented by or in apparatus 210 and apparatus 220 as well as any variations thereof. Solely for illustrative purposes and without limiting the scope, process 400 is described below in the context of apparatus 210 as a UE and apparatus 220 as a base station. Process 400 may begin at block 410.

At 410, process 400 may involve processor 212 of apparatus 210 establishing wireless communication with apparatus 220 as a network node of a wireless network. Process 400 may proceed from 410 to 420.

At 420, process 400 may involve processor 212 determining whether apparatus 210 is capable of operating in a second mode in addition to a first mode, where apparatus 210 may perform a given task in less time in the second mode than in the first mode. Process 400 may proceed from 420 to 430.

At 430, process 400 may involve processor 212 transmitting, via transceiver 216, to apparatus 220 a report indicating capability of apparatus 210 to operate in the second mode and a condition with respect to carrier aggregation (CA) associated with operating in the second mode.

In some implementations, the report may indicate the condition with respect to CA by indicating a maximum number of configured carriers supported for CA when operating in the second mode.

In some implementations, the report may further indicate a condition with respect to a throughput associated with operating in the second mode.

In some implementations, the first mode may be a baseline mode, and the second mode may be an aggressive mode in which apparatus 210 completes a task in less time than in the baseline mode.

In some implementations, process 400 may further involve processor 212 receiving, via transceiver 216, control signaling from apparatus 220 that configures a maximum number of configured carriers supported for CA when apparatus 210 operates in the second mode or in both the first mode and the second mode.

In some implementations, process 400 may further involve processor 212 performing additional operations. For instance, process 400 may involve processor 212 determining whether a number of configured carriers in a band is less than or equal to a maximum number of configured carriers supported for CA when operating in the second mode. Moreover, process 400 may involve processor 212 performing either of: (1) operating using all of the configured carriers in the band responsive to the number of the configured carriers in the band being less than or equal to the maximum number of configured carriers supported for CA, or (2) operating in the second mode with a single carrier in the band or in the first mode in the band responsive to the number of the configured carriers in the band being greater than the maximum number of configured carriers supported for CA.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   establishing, by a processor of a user equipment (UE), wireless communication with a network node of a wireless network;
   determining, by the processor, whether the UE is capable of operating in a second mode in addition to a first mode; and
   transmitting, by the processor, to the network node a report indicating capability of the UE to operate in the second mode and a condition with respect to a throughput associated with operating in the second mode,
   wherein the UE performs a task in less time in the second mode than in the first mode, and
   wherein the report further indicates a parameter related to the throughput of the UE in the second mode.

2. The method of claim 1, wherein the report indicates the throughput as a percentage of a maximum number of physical resource blocks (PRBs).

3. The method of claim 2, wherein the maximum number of PRBs comprises a maximum number of PRBs defined in $3^{rd}$-Generation Partnership Project (3GPP) specification for New Radio (NR).

4. The method of claim 2, wherein the maximum number of PRBs comprises a maximum number of PRBs of an operating channel bandwidth.

5. The method of claim 1, wherein the report indicates the throughput as a percentage of a peak throughput of the UE.

6. The method of claim 1, wherein the report indicates the throughput as a percentage of a maximum number of physical resource blocks (PRBs) per multiple-input-multiple-output (MIMO) layer by a maximum number of MIMO layers for downlink (DL) or uplink (UL) transmissions.

7. The method of claim 1, wherein the report further indicates a condition with respect to carrier aggregation (CA) associated with operating in the second mode.

8. The method of claim 1, wherein the first mode comprises a baseline mode, and wherein the second mode comprises an aggressive mode in which the UE completes a task in less time than in the baseline mode.

9. A method, comprising:
   establishing, by a processor of a user equipment (UE), wireless communication with a network node of a wireless network;
   determining, by the processor, whether the UE is capable of operating in a second mode in addition to a first mode;
   transmitting, by the processor, to the network node a report indicating capability of the UE to operate in the second mode and a condition with respect to carrier aggregation (CA) associated with operating in the second mode;
   determining, by the processor, whether a number of configured carriers in a band is less than or equal to a maximum number of configured carriers supported for CA when operating in the second mode; and
   performing, by the processor, either of:
      operating using all of the configured carriers in the band responsive to the number of the configured carriers in the band being less than or equal to the maximum number of configured carriers supported for CA, or
      operating in the second mode with a single carrier in the band or in the first mode in the band responsive to the number of the configured carriers in the band being greater than the maximum number of configured carriers supported for CA,
   wherein the UE performs a task in less time in the second mode than in the first mode.

10. The method of claim 9, wherein the report indicates the condition with respect to CA by indicating a maximum number of configured carriers supported for CA when operating in the second mode.

11. The method of claim 9, wherein the report further indicates a condition with respect to a throughput associated with operating in the second mode.

12. The method of claim 9, wherein the first mode comprises a baseline mode, and wherein the second mode comprises an aggressive mode in which the UE completes a task in less time than in the baseline mode.

13. The method of claim 9, further comprising:
   receiving, by the processor, control signaling from the network node that configures a maximum number of configured carriers supported for CA when the UE operates in the second mode or in both the first mode and the second mode.

14. An apparatus, comprising:
   a transceiver capable of wireless communicating with a network node of a wireless network; and
   a processor coupled to the transceiver, the processor capable of:
      determining whether the apparatus is capable of operating in a second mode in addition to a first mode;
      transmitting, via the transceiver, to the network node a report indicating capability of the apparatus to operate in the second mode and either or both of:
         a condition with respect to a throughput associated with operating in the second mode, and
         a condition with respect to carrier aggregation (CA) associated with operating in the second mode;

determining whether a number of configured carriers in a band is less than or equal to a maximum number of configured carriers supported for CA when operating in the second mode; and performing either of:
  operating using all of the configured carriers in the band responsive to the number of the configured carriers in the band being less than or equal to the maximum number of configured carriers supported for CA, or
  operating in the second mode with a single carrier in the band or in the first mode in the band responsive to the number of the configured carriers in the band being greater than the maximum number of configured carriers supported for CA, wherein the apparatus performs a task in less time in the second mode than in the first mode.

15. The apparatus of claim 14, wherein the report indicates the throughput as a percentage of a maximum number of physical resource blocks (PRBs), and wherein the maximum number of PRBs comprises a maximum number of PRBs defined in $3^{rd}$-Generation Partnership Project (3GPP) specification for New Radio (NR) or a maximum number of PRBs of an operating channel bandwidth.

16. The apparatus of claim 14, wherein the report indicates the throughput as a percentage of a peak throughput of the apparatus.

17. The apparatus of claim 14, wherein the report indicates the throughput as a percentage of a maximum number of physical resource blocks (PRBs) per multiple-input-multiple-output (MIMO) layer by a maximum number of MIMO layers for downlink (DL) or uplink (UL) transmissions.

18. The apparatus of claim 14, wherein the report indicates the condition with respect to CA by indicating a maximum number of configured carriers supported for CA when operating in the second mode.

* * * * *